(12) United States Patent
George et al.

(10) Patent No.: US 8,180,143 B2
(45) Date of Patent: May 15, 2012

(54) METHOD AND SYSTEM FOR ESTIMATING CONTACT PATTERNS

(75) Inventors: Sheri George, Bangalore (IN); Sivaramanivas Ramaswamy, Bangalore (IN); Abhinav Ramnath Bajpai, Erie, PA (US)

(73) Assignee: General Electric Company, Niskayuna, NY (US)

( * ) Notice: Subject to any disclaimer, the term of this patent is extended or adjusted under 35 U.S.C. 154(b) by 615 days.

(21) Appl. No.: 12/342,687

(22) Filed: Dec. 23, 2008

(65) Prior Publication Data

US 2010/0158349 A1 Jun. 24, 2010

(51) Int. Cl.
G06K 9/00 (2006.01)
(52) U.S. Cl. ........... 382/152; 356/394; 382/141; 73/162
(58) Field of Classification Search ................... 382/152, 382/141; 356/394; 73/162
See application file for complete search history.

(56) References Cited

U.S. PATENT DOCUMENTS

| | | | | |
|---|---|---|---|---|
| 4,285,133 A | * | 8/1981 | Sterki et al. | 33/501.9 |
| 4,322,889 A | * | 4/1982 | Guenter | 33/501.9 |
| 4,337,580 A | * | 7/1982 | Tanno et al. | 33/501.9 |
| 5,030,184 A | * | 7/1991 | Rennerfelt | 475/162 |
| 5,083,458 A | | 1/1992 | DeGeorge et al. | |
| 5,373,735 A | | 12/1994 | Gutman | |
| 5,610,994 A | | 3/1997 | Stadtfeld et al. | |
| 5,978,500 A | | 11/1999 | Broughton | |
| 6,148,098 A | | 11/2000 | Rutschke et al. | |
| 6,542,235 B1 | | 4/2003 | Caskey et al. | |
| 7,792,651 B2 | * | 9/2010 | George et al. | 702/82 |
| 2007/0058854 A1 | | 3/2007 | Caskey et al. | |
| 2007/0183633 A1 | * | 8/2007 | Hoffmann | 382/116 |
| 2008/0059076 A1 | | 3/2008 | Choi et al. | |
| 2008/0247663 A1 | | 10/2008 | Jacobsen | |

FOREIGN PATENT DOCUMENTS

| | | |
|---|---|---|
| JP | 3134539 A | 6/1991 |
| JP | 3134550 | 6/1991 |
| JP | 3134550 A | 6/1991 |
| JP | 2005098911 | 4/2005 |
| WO | 9635108 | 11/1996 |

OTHER PUBLICATIONS

A. Kubo et al., "Prediction of Performance of Involute Helical Gears by Observation of Tooth contact Pattern," Power Transmission and gearing conference, ASME 1996, DE-vol. 88, pp. 551-564.

J. Grabscheid et al., "A New Integrated Bevel and Hypoid Gear Tester," The American Society of Mechanical Engineers, Proceedings of the 1989 International Power Transmission and Gearing Conference, vol. two, Apr. 25-28, 1989, pp. 511-518.

M. Kajitani et al., "Automatic Visual Inspection of Tooth Contact Pattern of Gears," Japan Society of Preceding Eng., vol. 21, No. 2, Jun. 1987, pp. 101-106.

(Continued)

*Primary Examiner* — Tarifur Chowdhury
*Assistant Examiner* — Isiaka Akanbi
(74) *Attorney, Agent, or Firm* — Scott J. Asmus

(57) ABSTRACT

A gear inspection system and method for a gearbox, wherein an image acquisition unit is oriented proximate the gearbox with a field of view of a section of the gears. The image acquisition unit obtains images of a gear tooth and corresponding contact pattern. In one embodiment a processing unit transforms the images to a gear tooth model so that the gear tooth image and contact pattern image matches the model gear tooth. Metrics are computed for the contact pattern, and based on threshold values, a determination is made as to whether the gearbox is acceptable.

17 Claims, 5 Drawing Sheets

OTHER PUBLICATIONS

Lakeshore Vision & Robotics LLC., Gear Inspection Videos, 2006, pp. 1-3, www.lvrsystems.com/gear-videos.php.
JP3134550, ABSTRACT, Jun. 7, 1991.
JP2005098911, ABSTRACT, Apr. 14, 2005.
PCT International Search Report dated Apr. 6 2010.

* cited by examiner

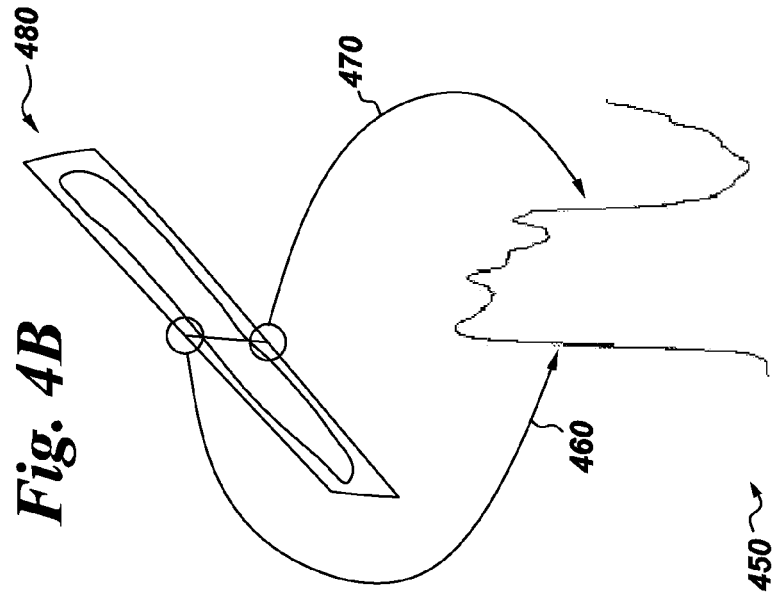
*Fig. 4B*
*Fig. 4C*
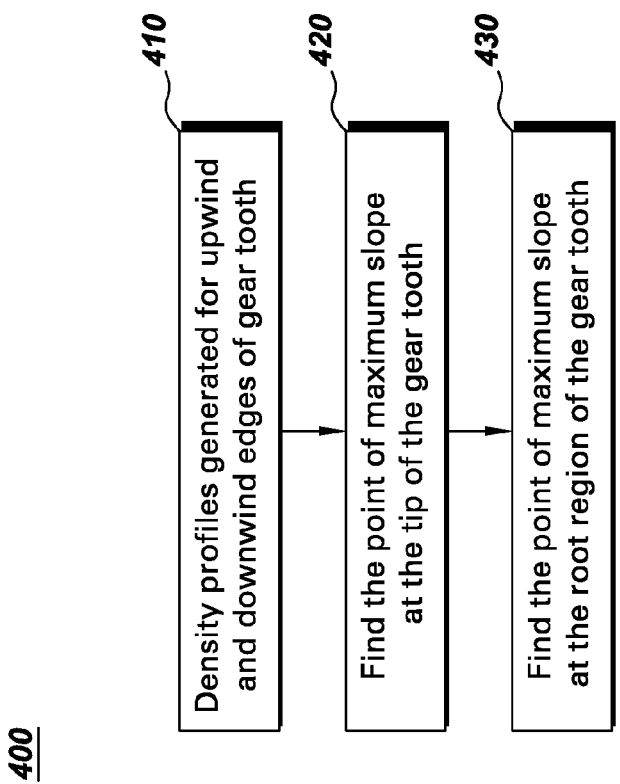
*Fig. 4A*

METHOD AND SYSTEM FOR ESTIMATING CONTACT PATTERNS

BACKGROUND

Gears are common mechanical devices that are used to transfer rotational forces. A gear is typically a round component with teeth that mesh with other gear teeth allowing the force to be transferred. The gear design, size and orientation are used to transmit the forces at different speeds, torques and direction. Gears are typically used to transfer a mechanical advantage by using gears of different sizes that allow for different rotational gear speeds and torque.

As part of the transfer of forces, the teeth of the one gear engage the teeth of another gear, resulting in gear meshing. For example, when a larger gear engages with a smaller gear, the larger gear rotates at a slower speed than the smaller gear as the teeth of the smaller gear engage a section of the gears of the larger gear.

One type of gear design is helical gear wherein the leading edges of the teeth are angled with respect to the axis of rotation. The gear is curved and the shape of the teeth is a segment of a helix with the angled teeth. The helical gears tend to run more smoothly and generate less noise.

A common application of gears is in relation to a driveshaft that converts engine shaft forces such as used in transmissions and gearboxes. For example, gearboxes of wind turbines typically utilize helical gears to transfer the rotational forces from the rotating shaft of the turbine blades to the engine that generates electrical power.

One of the problems of gear meshing is the precision mating required for efficient, quiet and long-lasting operation of the gear assembly. Factors affecting improper gear meshing include the tolerances of the gears as well as the assembly of the gears within the gearbox housing. These factors can cause noisy operations causing environmental hazards, lower efficiency and increased maintenance issues due to greater wear and tear of the gearbox components. The wear and tear can result in operative losses as well as catastrophic failure of components.

In order to mitigate the above noted problems, certain inspection technologies have been developed, wherein the contact patterns from the gear meshing are evaluated. For example, the teeth of the gears may be coated with a colored paint that shows the wear resulting from the gear meshing. In one example, the gears in the gearbox are painted with a colored coating such as a blue (Prussian blue) or red. During load testing, gears mesh with each other at different loads and different speeds, and due to the contact pressure during meshing the coating wears off on the face of the gears. The wear pattern or contact pattern on the gears at different loads and speeds signifies the quality of the gearbox assembly.

The contact pattern estimation is used to try and determine the acceptability of the gears. In some conventional systems the contact patterns are captured through images using cameras and estimated manually. In such processing, the operator performing the pattern estimation typically has no a priori knowledge of the orientation and distance of the gears. The contact pattern image is selected and manually compared with drawings of an acceptable contact pattern. If the captured images closely match the standards, then the gearbox assembly is accepted. However, there is a lack of quantified methods for accepting/rejecting the gears based on the contact pattern characteristics. The operator driven and manual process of comparison with standard photographs or drawings has limitations such as operator dependence and a qualitative nature of gear pattern quality determination. Improvements to the gear inspection and contact pattern estimation systems and process are desired in the industry.

BRIEF DESCRIPTION

The system and methods described herein relate generally to gear inspection and more particularly to semi-automated and automated contact pattern inspection.

One embodiment is a gear inspection system, including an assembled gearbox with an inspection port providing viewing of gears in the gearbox, wherein the gearbox is subject to speed or load testing thereby providing a contact pattern on a gear tooth of the gears. There is an image acquisition unit oriented proximate the inspection port with an acceptable field of view of a section of the gears, wherein the image acquisition unit obtains a gear tooth image with a contact pattern image. There is a processing unit with a computer readable medium storing a computer program, wherein the computer program transforms the gear tooth image and contact pattern image to a model of the gear tooth and wherein the processing unit computes metrics to determine whether the gearbox is acceptable.

The system in one aspect is automatic or semi-automatic and includes operator assistance. The automated system uses computer processing to control the various system functions and automatically makes an acceptability determination of the gearbox. In a semi-automatic operation, an operator can be used to ensure such features as checking whether the gear tooth image is adequate and making adjustment for an optimal orientation.

In one aspect, the image acquisition unit is at least one of a fixed position camera or an adjustable position camera. One feature includes having an adjustable image acquisition unit that is moveable and is positioned based on a computer-aided design (CAD) model of the gearbox.

The boundaries of the gear tooth image in one aspect include an upwind edge, a downwind edge, a tip edge and a root edge and are obtained from a number of points using gradient methods or optimal edge extraction methods. The processing is typically performed on a computer using a software program such as spline interpolation, Canny optimal edge extraction or ShenCastan optimal edge extraction.

According to one aspect, the boundaries of the contact pattern are determined by computing density profiles of intensity values across at least a section of the gear tooth, wherein a point having a maximum gradient identifies an edge of the contact pattern.

The metrics in one example are at least one of a ratio of an area of the contact pattern to an area of the gear tooth, a ovalisation of the contact pattern, a shape of the contact pattern, a shape of the upwind and downwind edges of the contact patterns, a distance from a center of the contact pattern to a center of the gear tooth, and a distance of upwind and downwind contact pattern edges from the gear edges.

One embodiment is a method for determining acceptability of a gearbox, including acquiring at least one image of a section of a gear in the gearbox, wherein the section includes a gear tooth with a contact pattern, processing the image to obtain a gear tooth image and a contact pattern image, obtaining boundaries of the gear tooth image and the contact pattern image, transforming the gear tooth image and the contact pattern image to match a model of the gear tooth, computing metrics for the transformed contact pattern, and comparing the metrics to predefined thresholds to determine acceptability of the gearbox.

A further embodiment is a gear inspection system, including an assembled gearbox having an inspection port and with a load tester coupled to the gearbox, wherein the load tester is capable of providing speed or load testing to one or more sets of gears in the gearbox. An image acquisition unit is oriented proximate the inspection port with a field of view of a section of the gears, wherein the image acquisition unit obtains images of a contact pattern on a gear tooth of the section of the gears. There is a processing unit with a computer readable medium storing a computer program, wherein the computer program processes the images from the image acquisition unit and transforms the images to match a model of the gear tooth. The computer program in one aspect computes metrics of the contact pattern and compares to threshold values to determine acceptability of the gearbox.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 4a-4c shows the long edge processing according to one embodiment;

DETAILED DESCRIPTION

The systems and methods detailed herein relates to the acquisition and characterization of contact patterns formed during gear meshing. This includes quantifying the contact patterns on the gears in gearboxes. The contact patterns are indicative of the deviations in profile of the gears and any misalignment in the gear assembly. Improper gear profile or any misalignment in gear assembly may cause problems some that may include gearbox noise and vibration that can result in the eventual failure of the gearbox.

Figure 1:
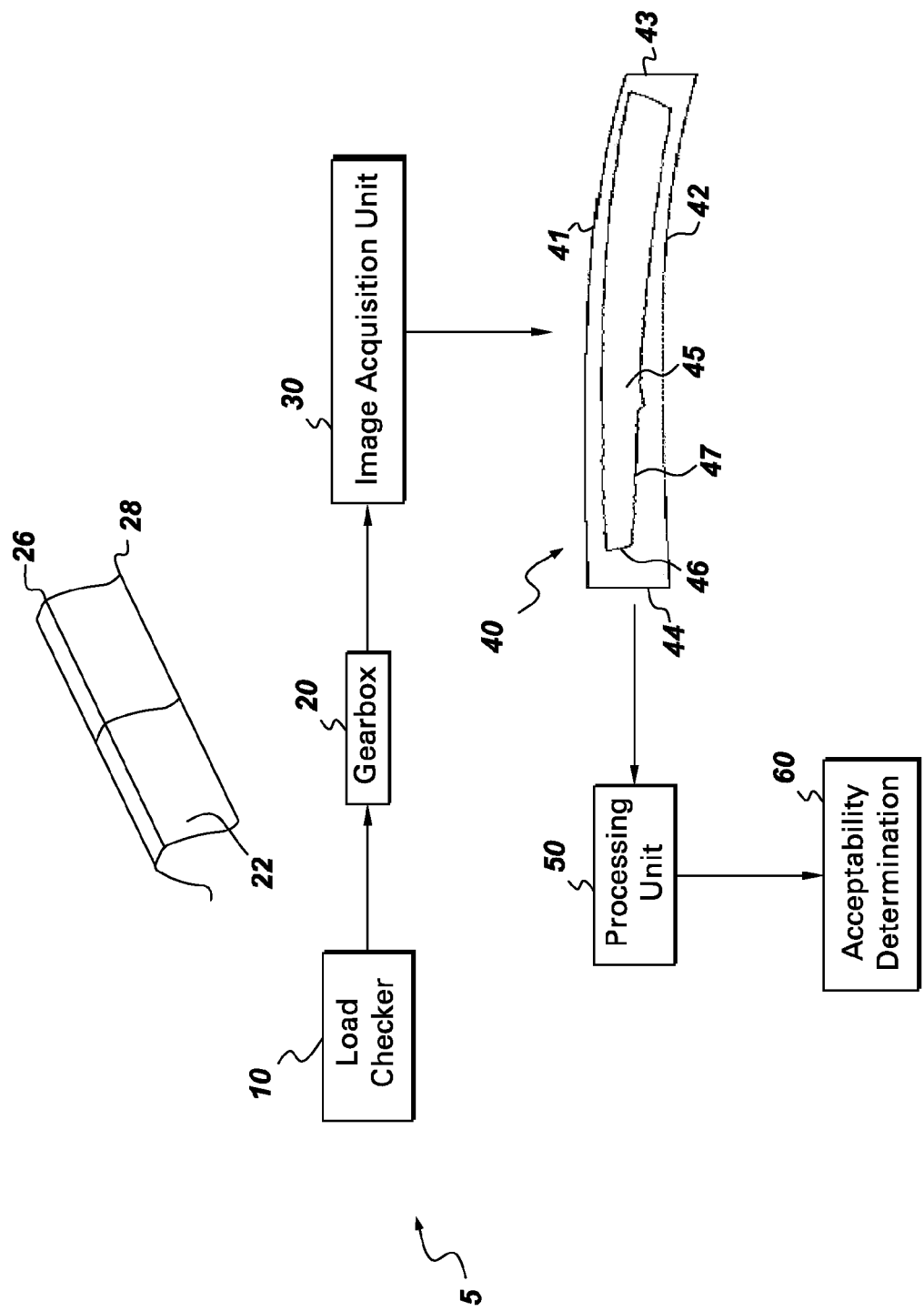
FIG. 1 illustrates a contact pattern estimation system according to one embodiment.

Referring to FIG. 1, a contact pattern estimation system 5 is depicted. According to one embodiment, the system 5 includes a load checker or load test unit 10 that is employed as part of the gear manufacturing process, prior to installation or post-installation. Initial load testing is typically done on gearboxes 20 after manufacturing, wherein a load checker 10 tests the gear unit 20 at different loads and/or at different speeds to evaluate the contact patterns and therefore the performance of the gearbox 20. The gearbox assembly 20 is deemed satisfactory if certain parameters such as the shape and size of the contact patterns on the gears, formed during meshing of gears, is within acceptable limits. While there are various types, shapes and sizes of gear, the gear typically has a tooth surface 22 with a root 28 and a tip 26 wherein gear meshing creates a contact pattern on the tooth. Other gears, such as helical gears, have a different shape but similar labeling of features.

The gearbox unit 20 employs an image acquisition unit 30 that consists of one or more cameras or other image acquisition devices that is inserted through the inspection windows of the gearbox 20. The image acquisition unit 30 is typically oriented such that the correct view of the gear pattern is captured. The field of view is such as to capture a satisfactory image of a section of the gears of the gearbox 20 such that the gear tooth and contact pattern occupies the maximum area in the image. In one embodiment, more than one gear tooth and contact pattern can be captured and processed. In another embodiment portions of gear tooth and contact patterns from different tooth are combined to reconstruct them.

In one embodiment, a computer or processor unit is used to control the position of the image acquisition unit 30. The computer simulates the computer-aided design (CAD) model of the gearbox to provide the location for acquiring the images of the gears at an optimal orientation. The design model in one example includes the location of the inspection port and the relationship of the gear teeth to the inspection port so that the distance and orientation are known. In one aspect the computer or processor changes the focal aspects of the imaging unit 30 to obtain the optimal view. A further aspect relates to control of the imaging unit 30 orientation and/or position such that the imaging unit can be turned or moved into an optimal position. The imaging unit 30 in one aspect is moveable and mounted with gimbals or onto a platform with servos or similar manipulators to control the position and orientation of the adjustable imaging unit. In one aspect, a snake or robot can be used to position the imaging unit in the best viewing area. A further aspect uses an operator to aid in identifying the best position.

Regardless of the manner in which the images are obtained, the images in one embodiment are subject to image processing techniques that utilize the CAD model to focus on the gear tooth and contact pattern in the region of interest.

Following the gear meshing, a gear tooth image 40 from the acquisition unit 30 is processed. The gear tooth image 40 has tip edge 41, root edge 42, upwind edge 44, downwind edge 43. The contact pattern 45 on the gear tooth 40 typically includes long edges 47 and short edges 46 that define the boundaries of the contact pattern 45. The image of the gear tooth should have adequate resolution, such that at least one gear tooth and contact pattern is visible to enable the subsequent processing for the boundaries of the gear edges and contact pattern edges and the assessment of acceptability. Depending upon the condition of the images, image processing may enhance the image to improve the image for subsequent processing, and this can be performed at the image acquisition unit 30 and/or the processing unit 50.

The captured image from the image acquisition unit 30 is transmitted to the process unit 50. The processing unit 50 such as a computer or other computing device or microprocessor takes the captured images and performs further processing steps. In one example the image acquisition unit includes a processing unit for performing some of all of the system processing. The resultant processing produces metrics concerning the contact pattern 45, which is compared to thresholds that are used to assess the quality of the gears and its acceptability.

According to one embodiment, the system 5 extracts the edges of the gear 41, 42, 43, 44 and edges of the contact pattern 46, 47 of the gear tooth 40. In one embodiment, the gear image is registered to the actual gear tooth by matching points of the gear edge image to points of the gear model, wherein the gear model is a priori information about the gear.

The resultant transformation is computed and this is used to correct for scaling and angling orientation or perspective differences of the contact pattern with respect to a model of the actual gear tooth. From the processed images, various metrics are computed such as the ratio of the area of the contact pattern to the gear tooth, the ovalisation of the contact pattern, the shape of the contact pattern, the shape of the upwind and downwind edges of the contact patterns, the off distance of the center of the contact pattern from the center of the gear tooth, and the minimum distances of upwind and downwind contact pattern edges from the gear edges. Ovalisation refers to the rounding of the edges of the contact pattern as opposed to having sharp clearly defined straight edges. It is a measure of the shape characteristics approaching an oval shape.

Figure 2:
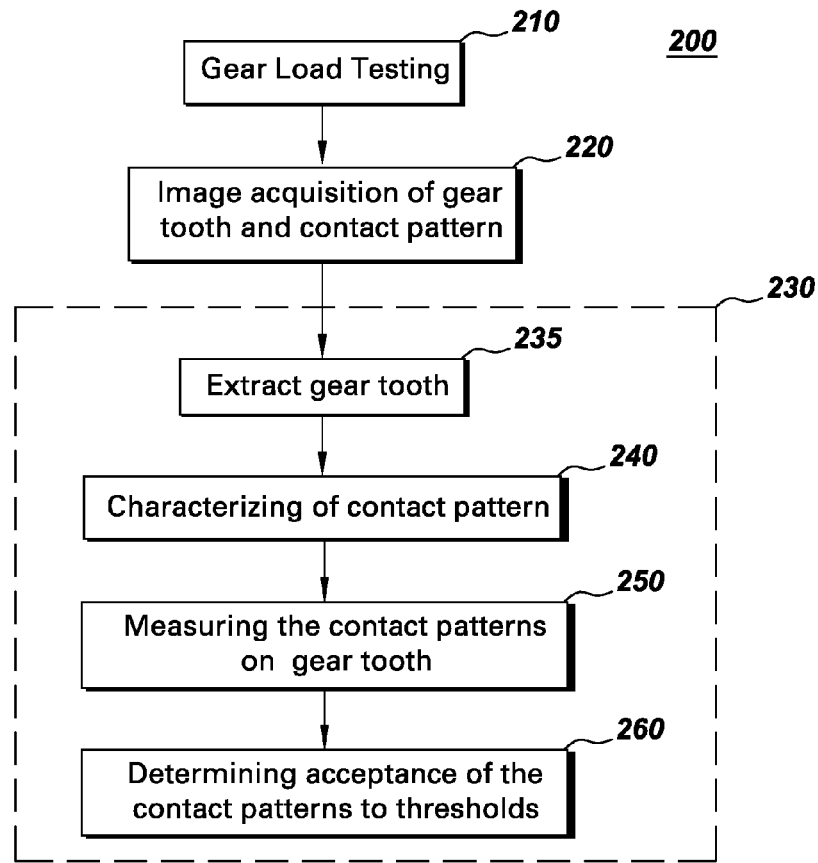
FIG. 2 illustrates a top level method for estimating contact patterns according to one embodiment.

Referring to FIG. 2, one method of contact pattern estimation is depicted. The gear load testing 210 applies load and speed dynamics to the gearbox, whether as a separate load checker or the actual system that the gearbox is deployed. In one example, one or more cameras are coupled about an inspection port of the gearbox and situated to provide a sufficient field of view of at least one section of the gear tooth. As noted, the gearbox is in an assembled state. The camera captures images of the gear tooth and the contact patterns on the gear tooth 220. In one embodiment the tooth employs paint, dyes or colored layer on the gear tooth that aids in discerning the contact pattern estimation as the paint wears off from the gear meshing.

The image of the contact patterns are then processed 230 that include extracting the gear tooth 235, characterizing the contact patterns 240, measuring the contact patterns on the gear tooth 250, and determining acceptance of the contact patterns and thereby validating the gearbox 260.

Extracting the gear tooth 235 involves determining the bounds of the gear tooth from the images, such as the upwind, downwind root and tip edges.

Characterizing the contact patterns 240 in one aspect refers to finding the boundaries of contact pattern edges with respect to the gear tooth by analyzing the sections of the gear tooth where the paint has been removed due to the gear meshing. The characterizing may also include transforming or otherwise manipulating the image of the gear tooth and its contact pattern to reflect the actual dimensions of the actual gear using a model of the gear such as from a CAD file. The contact pattern can then be analyzed and various metrics computed to determine the acceptability of the gear and gear assembly.

In operation, one embodiment pertains to systems and method for inspection and characterization of gear contact patterns that is used to assess the quality of the gears. According to one aspect, after assembling the gearbox and before shipping to the customer site, the contact pattern estimation and analysis is performed. The assembled gearbox is operated at several different load steps and speed, such as three different loads and speeds. During meshing, the contact patterns are formed on the gears. Based on the shape and characteristics of contact pattern, the quality of the gearbox assembly determined and if acceptable, the gearbox is shipped and installed.

Figure 3:
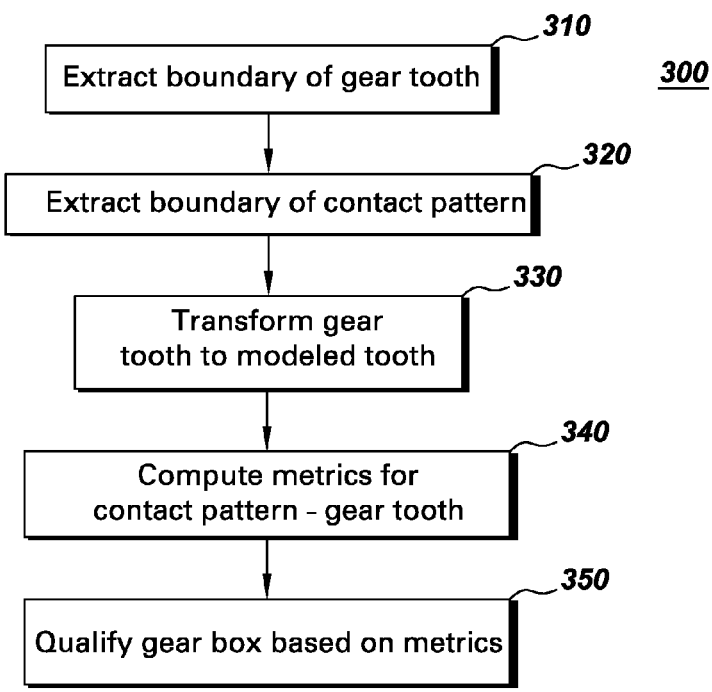
FIG. 3 depicts one method to characterize the contact pattern boundary processing according to one embodiment.

In FIG. 3, a further illustration of the processing for the contact pattern 300 according to one embodiment is depicted. The processing commences with the extraction of the boundaries of the gear tooth 310 from the images of the image acquisition unit. The boundaries of the gear tooth, including the upwind edge, downwind edge, tip edge and root edge can be obtained in a variety of methods. In one aspect the method of obtaining the boundaries of the gear tooth are extracted from a specified number of points on the gear edges by using spline interpolation. In another method, the boundary of the gear edge is extracted from the images using gradient methods or optimal edge extraction algorithms such as Canny or ShenCastan. The gear tooth boundaries can be automatically identified using edge extraction techniques or involve semi-automatic processing with an operator assisting in the edge determination.

The boundaries of the contact pattern are then extracted 320. In one aspect, a gradient methodology can be utilized. According to one embodiment, the gradient method computes the intensity profile across the gear tooth to determine the boundary of the contact pattern with respect to the gear edges. The intensity profile relates to discriminating between the regions of the gear tooth that has the paint removed versus the portions of the gear tooth that retains the paint, thereby indicating the gear meshing contact pattern.

One aspect utilizes histograms of the intensity profiles, wherein the histograms are a graphical representation of the distribution of the intensity values. In another embodiment, the histograms can be used for comparison of images taken over time, and one example uses the histogram to approximate the value the contact pattern region. Another example uses the histogram to show how quickly the paint is removed from the gear tooth and the portions that are first removed. Such processing can also be used for validation as to whether the contact pattern has been properly identified and for quality assurance. The boundary of the contact pattern can also be extracted from the images using gradient methods or optimal edge extraction algorithms such as Canny or ShenCastan.

In a further example, the contact pattern boundaries are determined by identifying the long and short edges of the contact pattern and forming the contact pattern boundaries. One aspect processes intensity values across the gear tooth and the intensity values are evaluated to identify the long edges of the contact pattern. Similarly intensity values are evaluated near the upwind and down wind edges of the gear tooth to identify the short edges of contact pattern.

In one embodiment the gear tooth with the contact pattern image is transformed to reflect a modeled tooth 330. The gear tooth image and its contact pattern are scaled and angled so that the gear tooth matches the size and shape of the modeled gear from the actual gear design. The modeled gear tooth can be derived from a CAD file or other design or manufacturing file for the gear tooth. In one aspect the modeled gear tooth is modeled using a priori information about the actual gear tooth such as the location of the middle of the gear tooth, depth of gear tooth, and face width of the gear tooth. The gear tooth image, including the contact pattern therein, is thus transformed using the modeled gear tooth so that the gear tooth and the contact pattern is sized and aligned to the actual gear tooth. The transformation of the gear tooth and the contact pattern in one embodiment is accomplished by linear transformation, projected transformation, or using a point transformation such as Iterative Closest Point (ICP).

According to one aspect, the gear is helical and the registration of the edge from the gear tooth image is referenced to the modeled helix and yields the transformation of the gear tooth image that is corrected for any skew and scale in the image. This transformation is also applied to the contact pattern for the scaling and perspective. The transformation processing corrects for imaging system parameters such as zoom, field of view, rotation, and translation.

Metrics are then computed for the transformed contact pattern gear tooth 340. The metrics for the transformed image are thus the same as the actual gear tooth as the dimensions are of the same scale. Various metrics of contact patterns are computed from this transformed data. The metrics may include ratio of the area of the contact pattern to the gear tooth, the ovalisation of the contact pattern, the shape of the contact pattern, the shape of the upwind and downwind edges of the contact patterns, the offset distance of the center of the contact pattern from the center of the gear tooth, and the minimum distances of upwind and downwind contact pattern edges from the gear edges.

The metrics can be computed by several methods from the contact patterns. Some of the metrics computations from the contact patterns are based on total area of the contact pattern, area ratio of the contact pattern and gear edge, center distance between the contact patterns and the gear edge center; distance of the leading edge of the upwind contact edge pattern and the gears as well as the downwind edge of the contact pattern and the gears.

Following the processing, the gearbox is assessed and the quality of the gearbox is quantified based on the computed metrics 350. The metrics are compared with thresholds and/or known standards to make a decision to accept/reject or correct the assembly of the gearbox. The processing is performed to determine whether the gears are manufactured and assembled properly in the gearbox. The assembly is currently acknowledged as a major source of the gearbox meshing problems, and early detection can be used to mitigate or remove such problems.

The methods described herein provide for quantified measurements of contact pattern, standardized contact pattern estimation, improvement of the productivity in the inspection process, and accurate inputs to contact pattern analysis for gear design/optimization. In one aspect the area of the contact pattern and the area of the gear tooth is computed for the transformed data and the area ratio provides an objective measurement of acceptability. For example, a threshold of at least 90% over a certain time period or number of gear revolution would indicate that the gear teeth are meshing evenly. In another measure, the distance between the contact pattern edges and the gear tooth edges are compared to threshold values. If the contact patterns are unevenly distributed, it may indicate that the gear or gear assembly requires adjustment.

The system encompasses methods for acquiring images of contact patterns from the gearbox, processing the image and quantifying the metrics of the contact pattern and qualifying contact patterns based on acceptance criteria.

According to one embodiment, the processing techniques perform the contact pattern measurements after correcting for scale and skew. The quantitative metrics found using the method are used for a number of uses such as optimization of manufacturing and vibration analysis.

In FIG. 4a, the contact pattern long edge processing 400 according to one embodiment is depicted. The process in this aspect generates density profiles for the upwind and downwind edges of the gear tooth 410. The density profiles are obtained from the transformed images and reflect the differences between the coated area of the gear tooth and the portion in which the paint has been removed from the gear meshing. In one aspect the density profile processing is used for identifying the long edges the contact pattern. By taking density profile along the entire length of the gear tooth, a number of points are obtained with intensity values. The intensity values along the density profile are processed wherein the maximum gradient or change defines the boundary of the contact pattern as it represents the change in intensity between the gear tooth coating and the contact area where the coating has been removed.

In one example, the intensity points define the long edges of the contact pattern. Finding the point of maximum slope or the maximum gradient interface point defines the long edge of the contact pattern proximate the tip edge 420. Obtaining the point of minimum slope or maximum gradient point interface point proximate the root edge of the gear tooth forms the long edge of the contact pattern 430.

FIG. 4b shows a gear tooth 480 with a center line parallel to the upwind and downwind edge of the gear tooth. The density profile 450 in one example is generated across the gear tooth 480 parallel to the upwind and downwind edges of the gear tooth. FIG. 4c shows a density profile 450 for the center line. The point of maximum slope or the maximum gradient interface point 460 shows defines the long edge of the contact pattern 440 proximate the tip edge. The point of minimum slope or maximum gradient point interface point 470 proximate the root edge of the gear tooth forms the long edge of the contact pattern 440. The processing of the entire gear tooth provides a density profile such that each point of maximum and minimum slope identifies the corresponding tip edge point and root edge point of the contact pattern 440.

Figure 5B:
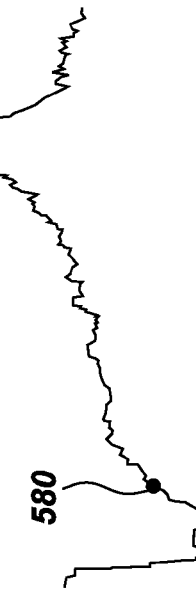
FIG. 5a-5c shows the short edge processing according to one embodiment.
Figure 5C:
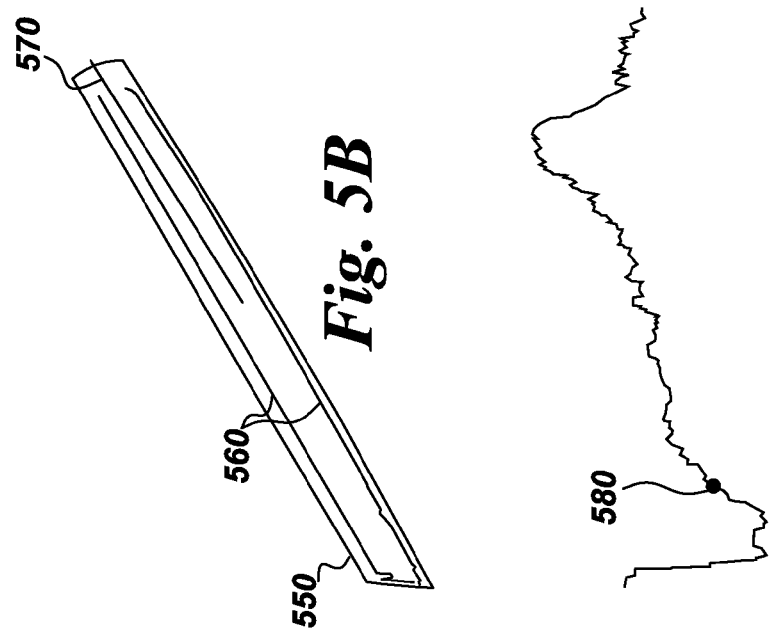
Figure 5A:
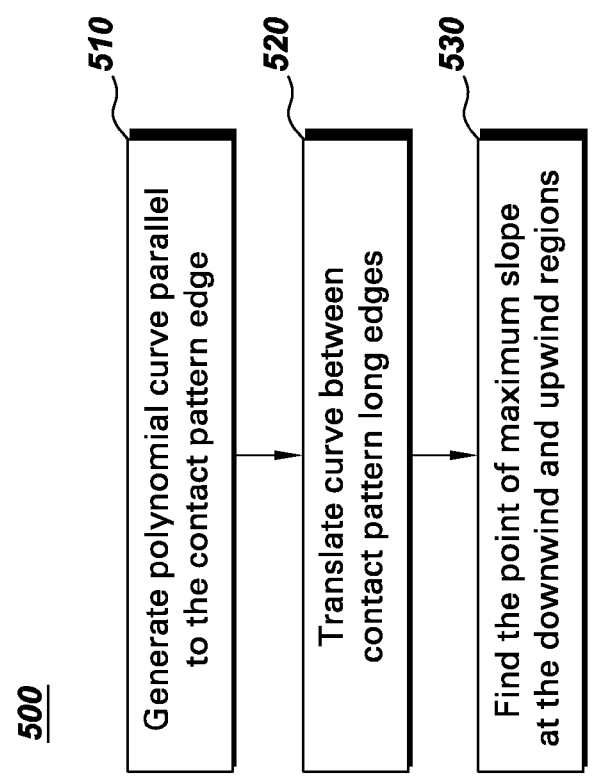

Referring to FIG. 5a, the contact pattern short edge processing is depicted according to one embodiment. In one example, the contact pattern long edges are identified by the processing noted in FIG. 4a-4c. In this example, a polynomial curve is generated parallel to the contact pattern long edge 510. The curve between the contact pattern long edges is translated 520.

A series of density profiles are processed for the region between the long edges is processed wherein the points of maximum slope at the downwind and upwind regions is derived 530 thereby identifying the short edge points of the contact pattern. Referring to FIG. 5b-5c, the long edges 560 of the gear tooth are previously defined and a center line parallel to the gear edge 550 can be centrally disposed or otherwise oriented between the gear edges 550. In one example a polynomial curve is generated between the long edges to approximate the location of the short edges for simplifying the processing. The density profiles are obtained across the width of the polynomial curve between the long edges such as shown in FIG. 5c. FIG. 5c shows the density profile for the centrally disposed line 570 and the maximum slope represents the interface point 580 thereby identifying a point on the short edge. The density profiles are obtained across the width of the long edges 560 and the maximum slope identifies each point along the short edge on the downwind edge. A similar process is performed on the upwind end to obtain the density profiles of the points across the width of the long edges to define the upwind side short edge represented as the pixel variation in the profile direction.

One embodiment generates a single polynomial curve across the long edges and processes the density profiles on each side. Another embodiment employs a polynomial curve on each of the upwind and downwind side and processes the density profiles accordingly. A further embodiment does not use the polynomial curves but processes the short edges similar to the long edges detailed in FIG. 4a. A line is deployed parallel to the long edges and centrally located between the long edges. The density profiles are obtained across the width of the gear edge and the maximum gradient points are processed to locate the short edges on the upwind and downwind side.

In one embodiment of processing the long and/or short edges, the number of points that are used to identify the long and short edges of the contact pattern is set according to the desired conditions. More accurate results are obtained by processing more points, but the processing of all points may be computationally difficult.

As noted herein, a helix profile for planet gear, helical gear, and high speed pinion are some of the gears used with the gearbox. Helix of the gear profile can be taken from electronic data such as computer-aided design (CAD), thereby having a priori knowledge of the helix angle, face width and module of the gear able to generate the helix profile for the gear, and axis data is registered to the helix profile.

In one embodiment a helix profile can be used for modeling, wherein the helix profiles are modeled through parametric equations as follows:

$$x = (D/2) \cdot \cos(\pi \cdot z/D \cdot \tan \beta')$$

$$y = (D/2) \cdot \sin(\pi \cdot z/D \cdot \tan \beta')$$

$$z = 0 \Rightarrow F$$

where D is the pitch circle diameter, $\beta'$ is the helix angle at that particular diameter and F is the face width and $\tan \beta_1 = (D1/D2) \tan \beta_2$. The helix profile in one embodiment is used to transform image of the gear tooth and the contact pattern to generate the transformed image. By way of further illustration, the actual gear tooth has a dimension face width wherein the image has a number of pixels such that there is a dimension difference between the image and the actual gear tooth. The transform is applied to the image and changes the scaling and the perspective so the image matches the actual gear.

Figure 6A:
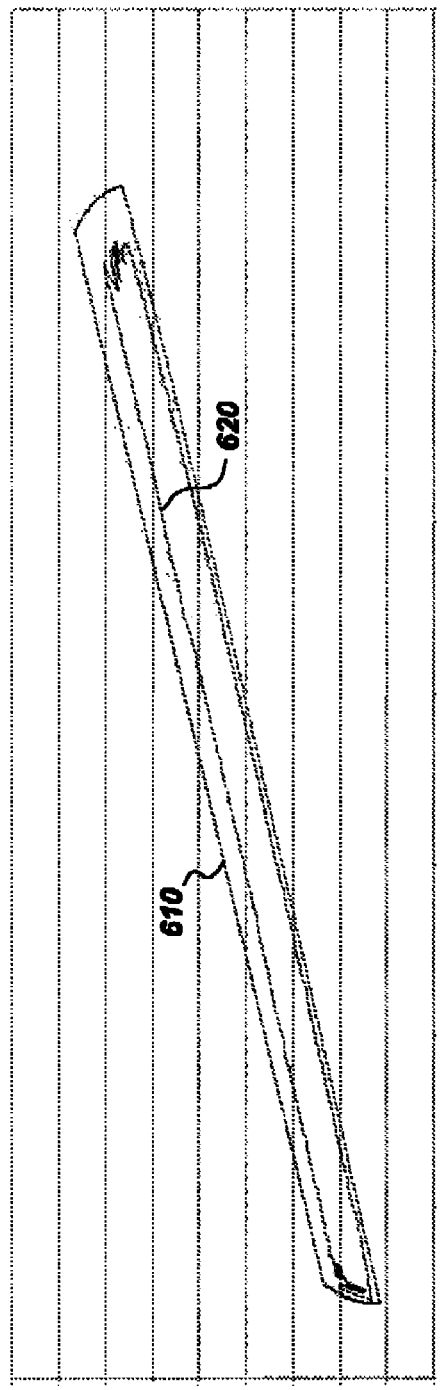
FIGS. 6a and 6b illustrate the before and after transformation of the gear tooth image according to one embodiment.
Figure 6B:
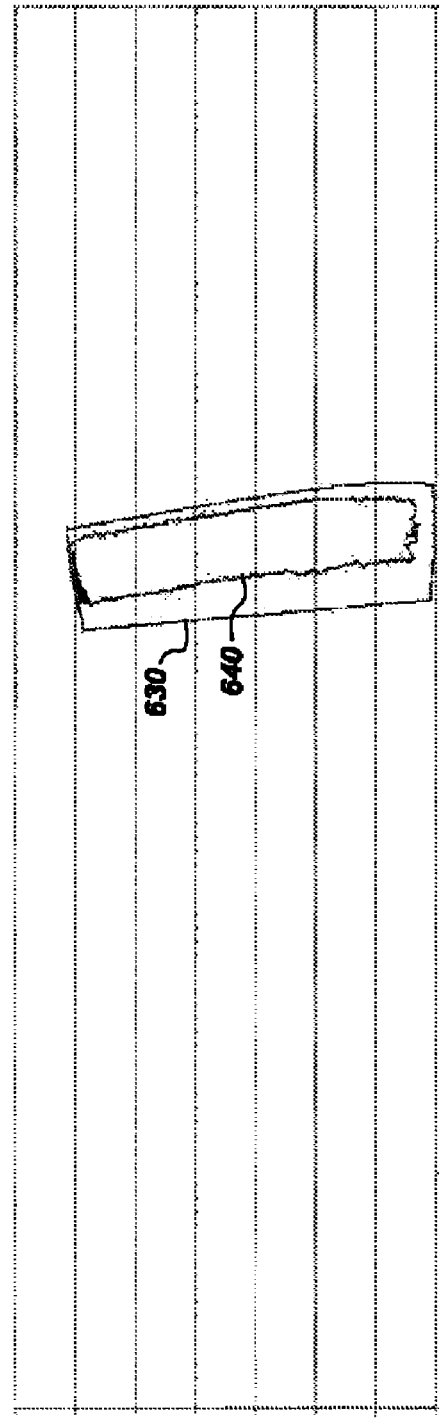

Referring to FIGS. 6a and 6b, the images are corrected for scaling and perspective and shows the before and after transformation. In this embodiment for helical gears, based on the helix profile, an ideal model of the gear tooth is generated. The gear tooth image 610 with the contact pattern 620 before the transformation is shown in FIG. 6a and is not scaled or angled with respect to the actual gear. The gear tooth image is then transformed by the helix model to correct for scaling and perspective, wherein the gear tooth image 610 and contact pattern image 620 are transformed to match the modeled gear tooth. As shown in FIG. 6b, the scale and angle are corrected, and all the metrics and dimensions extracted from the transformed gear tooth image 630 and transformed contact pattern image 640 corresponds to the dimensions of the modeled gear tooth.

In an illustrative embodiment, the inspection process is done by a load testing system after gears are manufactured with an applied load and speed. The gears mesh with each other in the process developing contact patterns on the gear teeth. Gears are typically coated with a dye so as they mesh with each other the dye wears off. The images of sections of the gears in a field of view are captured by the camera showing the contact patterns on the gears.

The present system measures the wear on the gears without dismantling. The gears mesh only at certain sections at a time and the camera captures the gears that are not currently meshed. The images portray the dye pattern changes at the sections of the unmeshed gears.

In one embodiment the field of view of the cameras captures the upwind side of the gear and the downwind side of the gear that represents the tip of the gear and the root of the gear. The system processing identifies the edges of the contact pattern and also the gear edges. In the conventional processing, the identification of the gear edges is a manual process. In contrast, the present system employs automatic or semi-automatic processing to identify the gear edges. One embodiment uses an interactive tool to mark the edges of the pictorial points of the gear and automatically identify the gear edges.

Once the gear edges are identified, the contact pattern edges are extracted. One embodiment uses a gradient method to process the contact edges. In one example, the system processes the gradients at different lines along the gear width and identifies the contact patterns.

The processing in one embodiment involves scaling with respect to actual gears and all dimensions and metrics are computed with respect to actual gear dimensions. Registration is used to match the dimension on the image with the actual dimensions. In one embodiment, projected transforms are used for registration. In another embodiment bilinear transform, affine or other similar transform is used.

Registration provides a transformation and it is applied to the gear tooth and the contact pattern. Thus, the contact pattern and gear are scaled to the actual size of the gear. As noted, one embodiment takes images for contact pattern inspection while mounted in the gearbox. Registration processing and scaling of the image to the to actual size of the gears and computing metrics to actual size of the gears is performed, such as the sun planet gears as well as multiple gear stages.

The camera can be positioned to take images of the planet gears, high-speed gears and high-speed pinion. One aspect manually orients the camera, while another embodiment deploys the camera on a snake that is pushed into the proper position. In another embodiment the camera is wireless and transfers the images using one of the wireless communications.

The image acquisition unit such as a camera can be positioned proximate an inspection port of the gearbox and in one aspect the inspection port is about 25 centimeters. In one example the light may or may not be injected into gearbox, although a flashlight of the camera can be used.

In contrast to some prior implementations, the system detailed herein does not use a separate fixture the inspection. One aspect of the system detailed herein is that contact patterns are estimated in gearboxes after load testing without disassembling the gears from the gearbox. The inspection of the contact pattern is performed through image acquisition via the inspection ports, thus eliminating the need for disassembly of gears from the gearbox. In one exemplary embodiment the contact pattern estimation allows for high accuracy and with processing time of less than five (5) seconds.

One embodiment of this system is for qualifying a gearbox and utilized in various industries such as aviation and energy, where gears are used as transmission devices. The system can be either provided as a service offering or the entire system can be developed and offered as inspection equipment.

According to one embodiment, the system and method is for characterizing the contact patterns of gears for wind turbines. The gearboxes of wind turbines typically have three stages of sun and planet gears. The three gears include high-speed pinion, helical gear and planet gears that are inspected for contact patterns. However, the method and system herein can be applied to any gearbox inspection for contact patterns.

The system according to one embodiment performs an automatic or semi-automatic analysis of the gear contact patterns. Visual images are taken by inserting one or more cameras through the inspection windows of the gearbox without disassembly. The cameras are oriented so that the desired field of view of the contact pattern is captured for a section of the gears. The processing of the images quantitatively evaluates the contact patterns and determines the acceptability of the gears in the gear assembly.

In yet another embodiment, the data from the contact pattern estimation and the corresponding information about the gear tooth and the contact pattern is used to optimize the gear design and gear assembly. The data in one example is stored and provides the gear designers and assembly personnel information that can aid in quality assurance programs. For example, if the contact patterns begin to stray towards one of the edges, it may indicate a problem in the gear manufacturing or assembly. Further analysis of the metrics can be used to review the dimensions of the gear teeth to determine if the characteristics of the gear teeth have changed over time. By way of another example, if the test data shows a consistently small contact pattern, there may be design issues that require investigation. The testing can be used to assess the optimal design based on quality scores of the metrics.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A gear inspection system, comprising:
an assembled gearbox with an inspection port providing viewing of gears in said gearbox, wherein said gearbox is subject to speed or load testing providing a contact pattern on a gear tooth;
an image acquisition unit oriented proximate said inspection port with an acceptable field of view of a section of the gears, wherein said image acquisition unit obtains a gear tooth image with a contact pattern image; and
a processing unit with a computer readable medium storing a computer program, wherein the computer program determines boundaries of the contact pattern image by computing density profiles of intensity values across at least a section of the gear tooth image, wherein a point having a maximum gradient identifies an edge of the contact pattern and transforms the gear tooth image and contact pattern image to a model of said gear tooth and wherein the processing unit computes metrics to determine whether the gearbox is acceptable.

2. The system according to claim 1, wherein the system is automatic or is semi-automatic and includes operator assistance.

3. The system according to claim 1, wherein the image acquisition unit is at least one of a fixed position camera or an adjustable position camera.

4. The system according to claim 1, wherein the image acquisition unit is moveable and is positioned based on a computer-aided design (CAD) model of said gearbox.

5. The system according to claim 1, wherein boundaries of the gear tooth image, include an upwind edge, a downwind edge, a tip edge and a root edge and are obtained from a number of points using spline interpolation, Canny optimal edge extraction or ShenCastan optimal edge extraction.

6. The system according to claim 1, wherein said metrics are at least one of a ratio of an area of the contact pattern to an area of the gear tooth, an ovalisation of the contact pattern, a shape of the contact pattern, a shape of the upwind and downwind edges of the contact patterns, a distance from a center of the contact pattern to a center of the gear tooth, and a distance of upwind and downwind contact pattern edges from respective gear edges.

7. The system according to claim 1, further comprising a lighting source for illuminating the field of view, wherein said lighting source is an external light or integrated with said image acquisition unit.

8. A method for determining acceptability of a gearbox, comprising;
acquiring at least one image of a section of a gear in said gearbox, wherein said section includes a gear tooth with a contact pattern;
processing said image to obtain a gear tooth image and a contact pattern image;
obtaining boundaries of said gear tooth image and said contact pattern image, wherein boundaries of the contact pattern image are determined by computing density profiles of intensity values across at least a section of the gear tooth image, wherein a point having maximum gradient identifies an edge of the contact pattern;
transforming said gear tooth image and said contact pattern image to match a model of said gear tooth;
computing metrics for said transformed contact pattern; and
comparing said metrics to predefined thresholds to determine said acceptability of the gearbox.

9. The method according to claim 8, wherein said transforming uses a helix profile.

10. The method according to claim 8, wherein said acquiring further comprises positioning said image acquisition unit for an optimal view of said gear tooth using a computer-aided design (CAD) model of said gearbox.

11. The method according to claim 8, further comprising computing histograms of the density profiles.

12. The method according to claim 8, wherein the transforming is performed using at least one of projected transforms, bilinear transforms, or affine transforms.

13. The method according to claim 8, further comprising using said metrics for optimizing the gear design and gear assembly.

14. A gear inspection system, comprising:
an assembled gearbox having an inspection port;
a load tester coupled to the gearbox, wherein said load tester is capable of providing speed or load testing to one or more sets of gears in said gearbox;
an image acquisition unit oriented proximate the inspection port with a field of view of a section of the gears, wherein said image acquisition unit obtains images of a contact pattern on a gear tooth of the section of the gears; and
a processing unit with a computer readable medium storing a computer program, wherein the computer program determines boundaries of the contact pattern image by computing density profiles of intensity values across at least a section of the gear tooth image, wherein a point having a maximum gradient identifies an edge of the contact pattern and processes the images from the image acquisition unit and transforms the images to match a model of the gear tooth.

15. The system according to claim 14, wherein said computer program computes metrics of said contact pattern and compares to threshold values to determine acceptability of the gearbox.

16. The system according to claim 14, wherein the processing unit simulates a computer-aided design (CAD) model of said gearbox to provide an optimal orientation for acquiring the gear tooth image.

17. The system according to claim 16, wherein the image acquisition unit is moveable and is positioned at said optimal orientation.

* * * * *